(12) United States Patent
Abdul-Rahman et al.

(10) Patent No.: US 8,931,309 B2
(45) Date of Patent: Jan. 13, 2015

(54) APPARATUS FOR THERMAL DECOUPLING OF A FORMING BODY IN A GLASS MAKING PROCESS

(75) Inventors: Rashid Abdul-Rahman, Horseheads, NY (US); Bulent Kocatulum, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 360 days.

(21) Appl. No.: 13/431,340

(22) Filed: Mar. 27, 2012

(65) Prior Publication Data

US 2013/0255321 A1    Oct. 3, 2013

(51) Int. Cl.
*C03B 17/06*            (2006.01)

(52) U.S. Cl.
CPC .................................... *C03B 17/061* (2013.01)
USPC .......................................................... 65/203

(58) Field of Classification Search
CPC .... C03B 17/06; C03B 17/061; C03B 17/062; C03B 17/064; C03B 17/065; C03B 17/067; C03B 17/068
USPC ........................................................... 65/203
See application file for complete search history.

(56) References Cited

U.S. PATENT DOCUMENTS

| | | | |
|---|---|---|---|
| 3,338,696 A | 8/1967 | Dockerty | 65/145 |
| 3,506,429 A | 4/1970 | Overman | 65/203 |
| 3,682,609 A | 8/1972 | Dockerty | 65/83 |
| 5,562,749 A | 10/1996 | Gessler, II et al. | 65/99.2 |
| 6,748,765 B2 | 6/2004 | Pitbladdo | 65/53 |
| 2003/0121287 A1 | 7/2003 | Chalk et al. | 65/90 |
| 2006/0016219 A1 | 1/2006 | Pitbladdo | 65/29.21 |
| 2008/0282736 A1 | 11/2008 | Filippov et al. | 65/90 |
| 2011/0126587 A1 | 6/2011 | Berkey et al. | |

FOREIGN PATENT DOCUMENTS

| | | |
|---|---|---|
| EP | 1 746 076 | 1/2007 |
| JP | 2530060 Y2 | 12/1996 |
| KR | 10-2010-0126227 A | 12/2010 |
| WO | 03/051783 | 6/2003 |
| WO | 03/055813 | 7/2003 |
| WO | 2005/110934 | 11/2005 |
| WO | 2011-066064 A2 | 6/2011 |

OTHER PUBLICATIONS

PCT/US2013/033854 Search Report.

*Primary Examiner* — Joseph S Del Sole
*Assistant Examiner* — Russell Kemmerle, III
(74) *Attorney, Agent, or Firm* — Kevin M. Able

(57) ABSTRACT

An apparatus for forming a glass sheet with reduced thermal coupling between upper and lower regions of the apparatus is disclosed. The apparatus allows for temperature changes near the lower regions of the enclosure without a large temperature impact on the upper regions of the enclosure, thereby providing for greater flexibility in setting a temperature profile for a forming body located within the enclosure.

7 Claims, 4 Drawing Sheets

APPARATUS FOR THERMAL DECOUPLING OF A FORMING BODY IN A GLASS MAKING PROCESS

BACKGROUND OF THE INVENTION

1. Field of the Invention

This invention relates to fusion processes for producing sheet glass and, in particular, to fusion processes which employ a refractory forming body disposed within an enclosure.

2. Technical Background

The fusion process is one of the basic techniques used in the glass making art to produce sheet glass. Compared to other processes known in the art, e.g., the float and slot draw processes, the fusion process produces glass sheets whose surfaces have superior flatness and smoothness without the need for post-forming surface grinding or polishing. As a result, the fusion process has become of particular importance in the production of the glass substrates used in the manufacture of liquid crystal displays (LCDs).

In an exemplary fusion downdraw process, once steady state operation has been achieved, molten glass overflows the top of a trough in a forming body on both sides to form two streams of molten glass that flow downward and inward along outer converging surfaces of the forming body. The two streams meet at the bottom or root of the forming body where they fuse together into a single glass ribbon. The glass ribbon is then fed to drawing equipment that draws the glass ribbon from the root of the forming body. The rate at which the ribbon is drawn influences the final thickness of the ribbon.

The ability to draw molten glass from the forming body in a continuous ribbon with flat, smooth surfaces requires precise temperature control of the molten glass as the glass is supplied to and drawn from the forming body. Such temperature control is typically provided by heating elements disposed in a plenum formed by an enclosure surrounding the forming body Inner enclosure walls positioned between the heating elements and the forming body are typically good conductors of heat in order to effectively transfer heat energy from the heating elements to the forming body. They also serve to even out the heat energy and eliminate hot spots. Nevertheless, the thermal conductivity of the inner wall also serves to conduct heat upward so that power changes in the lower heating element(s) can result in a temperature increase at the top of the enclosure, effectively coupling the upper temperature to changes in the lower enclosure. Thus, it becomes difficult to control the temperature at the root without affecting glass temperature at the top of the forming body.

SUMMARY

In one aspect an apparatus for forming a glass sheet is disclosed comprising: an enclosure comprising an upper inner wall portion, a lower inner wall portion and an outer wall spaced apart from the upper and lower inner wall portions to form a plenum therebetween; a forming body comprising a trough and converging forming surfaces positioned within the enclosure; a plurality of heating elements positioned within the plenum; a thermal barrier extending across the plenum and positioned between a lower-most heating element and a vertically adjacent heating element, the thermal barrier comprising an insulating layer and a structural member; and a thermal insulating block positioned between and separating the upper inner wall portion from the lower inner wall portion. The insulating layer in some embodiments is equal to or greater than about 2.5 cm. In some examples a bottom of the thermal insulating block is positioned above an upper surface of the structural member. In other examples the structural member is supported by the thermal insulating block. In still other examples an upper surface of the thermally insulating block is positioned below the structural member. The inner lower wall portion may be supported by a refractory insulating member.

In another aspect an apparatus for forming a glass sheet is described comprising: an enclosure comprising an upper inner wall portion, a lower inner wall portion and an outer wall spaced apart from the upper and lower inner wall portions to form a plenum therebetween; a forming body comprising a trough and converging forming surfaces positioned within the enclosure; a plurality of heating elements positioned within the plenum; a thermal barrier extending across the plenum and positioned between a lower-most heating element and a vertically adjacent heating element, the thermal barrier comprising an insulating layer and a structural member; a thermal insulating block positioned between and separating the upper inner wall portion from the lower inner wall portion; and a refractory thermal insulating member supporting the inner lower wall portion.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate an exemplary embodiment of the invention and, together with the description, serve to explain the principles and operations of the invention.

DETAILED DESCRIPTION

Figure 1:
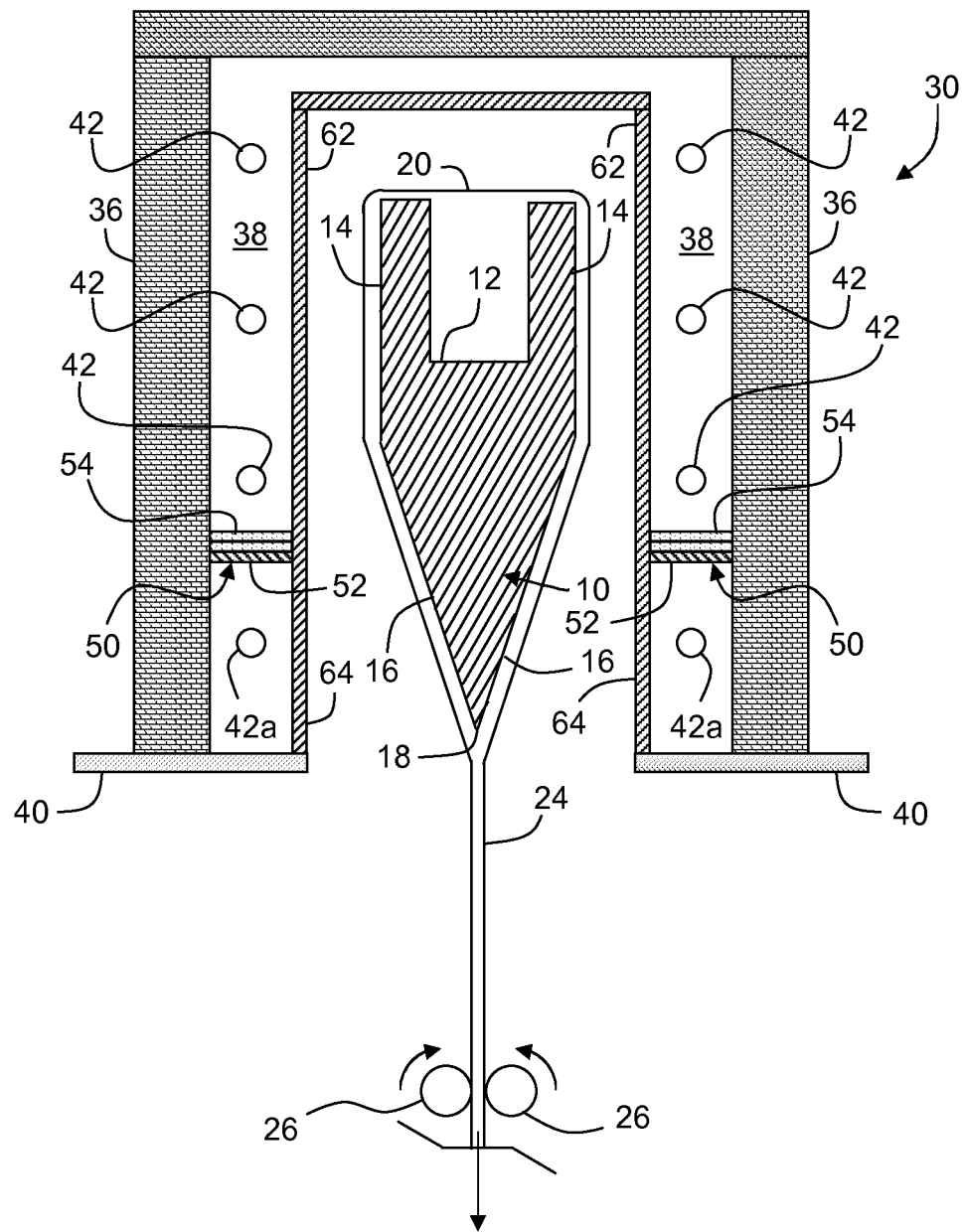
FIG. 1 is a cross sectional end view a forming body used in an exemplary fusion downdraw process for making glass sheet.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As shown in FIG. 1, an example glass making apparatus 30 is presented comprising forming body 10 used in a typical fusion process. Forming body 10 comprises trough 12 formed in an upper surface of the forming body and bounded by walls 14, and converging exterior forming surfaces 16 that meet along a line at the lower extremity of the forming body, hereinafter called the root 18. Molten glass 20 is supplied to trough 12 and overflows walls 14 to form separate streams 22 of molten glass that flow downward over the exterior surfaces of the forming body, including converging forming surfaces 16. The separate streams of molten glass merge or fuse at the root to form a continuous ribbon 24 of molten glass that cools from a viscous liquid to an elastic solid as ribbon 24 descends from root 18. Opposed and counter-rotating rolls 26 engage edge portions of the descending ribbon and aid in drawing the ribbon from the forming body in a draw direction 28. Draw direction 28 is typically a vertical direction, although in some embodiments the draw direction can be diverted to a non-vertical direction.

The ability to produce a glass sheet of extraordinary flatness and surface smoothness from molten glass flowing over forming body 10 depends on controlling a number of different process variables, including the draw rate, temperature and viscosity of the molten glass. For example, to successfully draw molten glass from the root, the molten glass should have a minimum viscosity. If the viscosity is too low, the ribbon may not be capable of supporting the applied drawing forces. For example, a typical minimum viscosity is approximately 100,000 Poise, although in some configurations glass having a viscosity as low as 50,000 Poise can be drawn.

Some glass compositions, for example, may have a low viscosity at a given draw temperature and require a cooler temperature at the forming body root to increase the viscosity of the glass to an appropriate draw viscosity. Conversely, other glass compositions may have a higher viscosity at the given draw temperature and require a higher root temperature to achieve an appropriate draw viscosity. There is no one glass composition that is universally acceptable for all applications. Thus, there is a need to control the thermal environment of the forming body, and in particular to control the temperature at the forming body root substantially independently of the temperature at the top of the forming body.

Another attribute of the glass that may be considered is the liquidus temperature of the glass, where the liquidus temperature is the temperature at which the glass will begin to crystallize if maintained at or below that temperature for an appreciable time.

Finally, because the forming body is generally formed from a refractory ceramic material, and the molten glass exhibits corrosive characteristics in its molten state, the ceramic material from which the forming body is constructed can dissolve in the molten glass flowing over the forming body surfaces, then precipitate out, often at the forming body root or other lower surfaces. The precipitated material can disrupt the flow of molten glass, thereby affecting the smoothness of the ribbon surface. Accordingly, various factors require that the temperature profile over the height of the forming body be controlled. For example, as described above, it may become necessary to increase the viscosity of the molten glass at the root to fusion draw the glass. This can require increasing the temperature in the vicinity of the root by increasing the power to heating elements positioned near the root. However, hot air rises, and increasing the temperature at the bottom of the forming body can have the undesirable consequence of also increasing the temperature at the top of the forming body, thereby increasing the amount of forming body material dissolved into the molten glass.

FIG. 1 further illustrates forming body 10 positioned within enclosure 32. Enclosure 32 is a multi-walled structure comprising an inner wall 34 and an outer wall 36 spaced apart from inner wall 34 so that a void or plenum 38 exists between the inner wall and the outer wall. Outer wall 34 may be a brick material, such as a refractory brick. Inner wall 36 may be a sintered silicon carbide material such as Hexaloy, or any other suitable high temperature-resistant material with good thermal conductivity. In the embodiment pictured in FIG. 1, both inner wall 34 and outer wall 36 are supported by support member 40. Support member 40 may be, for example, a structural steel member capable of supporting the weight of at least the inner and outer walls at operating temperatures without deformation.

Enclosure 32 aids in forming a controllable environment around forming body 10, thereby isolating the molten glass from external influences as much as possible. To heat the forming body, and the molten glass contained therein, enclosure 32 typically contains heating elements 42 positioned within plenum 38. Heating elements 42 are typically electrical resistance heaters utilizing wire coils, or more commonly metal bars. Multiple heating elements may be arranged in a vertical array for example, and in some embodiments may further comprise horizontal arrays that extend along the length of the enclosure. Each of the plurality of heating elements is preferably individually controlled using appropriate well-known heating control methods and equipment. Heating elements 42 may, for example, be manually controlled, thermostatically controlled, or preferably computer controlled so that an appropriate temperature profile may be more easily maintained within enclosure 32. The heating elements may also be controlled in banks or blocks, wherein groups of heating elements are controlled together. That is, wherein all the heating elements of a group of heating elements receive the same magnitude of electrical current. In some embodiments where conductive bars are employed as heating elements, the cross sectional diameter, or other cross sectional attribute, may be varied along the length of the bar, providing a predetermined profile appropriate for a particular temperature distribution. Since the resistance of the heating element, and thus the temperature attained for a given current flow depends on the cross sectional area of the conductor, a tailored temperature profile can be provided horizontally along a length of the forming body by appropriately forming the cross sectional shape of the heating element to produce different temperatures as a function of the length of the heating element.

In an unobstructed common plenum 38, the upper portion of the plenum, and enclosure 32, is heated with a contribution from all heating elements within the common plenum by both radiation and convection. By unobstructed what is meant is the plenum is not completely blocked so that bottom portions of the plenum are not open to top portions of the plenum. Heat energy that might otherwise be directed toward the converging forming surfaces 16 of forming body 10, and particularly toward root 18 by the lower-most heating elements 42a is instead lost to the upper portions of enclosure 32 and forming body 10 through the common plenum. Hence, the upper portions of the forming body, and the molten glass overflowing the upper portions, receive more heat than intended, while the lower portions of the forming body receive less heat than intended. Thus, to reach the desired root temperature the upper portion of the forming body (and molten glass contained therein) may exceed the desired temperature. This offset in heating may lead to an unacceptably large temperature differential ΔT between the upper and lower portions of the forming body.

The temperature difference between the glass at the top of the forming body and the glass at the bottom of the forming body should be minimized to reduce the amount of forming body material that may be dissolved into the molten glass flowing over the surfaces of the forming body and crystallizable if the temperature of the molten glass is too low.

Inclusions in the molten glass can occur when the amount of dissolved forming body material exceeds the saturation level for the given glass conditions at the temperature of the molten glass. If, for example, the forming body is formed from zircon, zircon crystal growth at the bottom of the forming may be promoted. The dissolved material comes out of solution and may be deposited as crystals on the surface of the forming body. If allowed to grow sufficiently large, these crystals may break off and become entrained in the glass flow. This is unacceptable from a quality perspective.

Since two key contributing factors for the dissolution of the forming body are time and temperature, one way to eliminate the re-growth of the forming body constituent material is to reduce the maximum temperature of the glass in or on the forming body, particularly at the hotter upper portions. At the same time, the temperature of the flowing glass must be maintained above the liquidus temperature of the glass at the lower extremes of the forming body—the root region—to prevent devitrification of the glass. Thus, it may be desirable to increase the temperature of the glass at the bottom of the forming body while simultaneously decreasing the temperature of the glass flowing over the top of the forming body: in other words, to reduce the temperature differential or gradient between the top of the forming body and the bottom of the forming body.

Another reason for controlling the temperature differential over the height of the forming body is to facilitate startup of the apparatus. That is, to heat the forming body to an appropriate operating temperature, for example, after a repair shutdown. The forming body is generally a monolithic block of a refractory (ceramic) material that, if not heated substantially uniformly, may crack from thermal stresses during heat up. In a conventional fusion process an increase in the power supplied to the lower-most heating element(s) to raise the temperature of the root region also increases the temperature at the top of the forming body, potentially increasing the temperature differential between the top of the forming body and the bottom of the forming body. Thus, the temperature at the top of the forming body becomes the controlling factor during heat up of the forming body. By reducing the coupling between the temperature at the top of the forming body from the temperature at the bottom of the forming body, the temperature differential between the top and bottom of the forming body, and stresses resulting from uneven heating, can be reduced. Here, coupling refers to the influence of temperature in one location (e.g. the bottom of the forming body) to the temperature in another location (e.g. the top of the forming body).

Attempts to reduce the temperature differential between the top of the forming body and the root may be difficult, since increasing the power directed to the lower-most heating elements to raise the temperature of the root typically also increases the temperature at the top of the forming body as previously described. Thus, the temperature at the root is effectively coupled to the temperature at the top of the forming body, wherein a change in temperature at one location results in a change in temperature at another location In some instances a thermal barrier 50 is provided within enclosure 32 and extending across plenum 38 to isolate the lower-most heating elements 42a from the remainder of the heating elements of enclosure 32 within plenum 38, thereby controlling radiative heating of the plenum above the barrier.

Thermal barrier 50 may be comprised of one or more layers. For example, one layer may be a layer that provides structural integrity or strength to the barrier, while one or more additional layers provide the majority of the insulating properties of the thermal barrier. It has been found that a SiC barrier, for example, while providing the necessary strength and resistance to high temperature degradation, may in and of itself be insufficient to provide the needed thermal properties. Thus, in some embodiments, thermal barrier 50 comprises a structural member 52 (e.g. SiC) and one or more thermally insulating layers 54. The insulating layers may comprise, for example, high temperature ceramic fiberboard such as Duraboard® 2600. Structural member 52 supports the insulating layer 54. Thus, thermal barrier 50 aids in decoupling the temperature at the top portions of the forming body from the temperature at the bottom portions of the forming body. Additionally, since heating elements occasionally fracture and fall, structural member 52 beneficially provides mechanical protection to the lower-most heating elements 42a, and components of the fusion apparatus below thermal barrier 50.

While the foregoing thermal barrier positioned between adjacent heating elements is effective in reducing radiative heating within the enclosure, it is only minimally effective at reducing conductive heating of the enclosure. That is, inner walls 34 are intentionally formed from a material that is a good thermal conductor so that heating elements 42 are effective at heating the interior of enclosure 32. However, this ensures the inner walls are also effective at conducting heat from the lower portions of the inner wall to the upper portions of the inner wall, near the top of the forming body.

Figure 2:
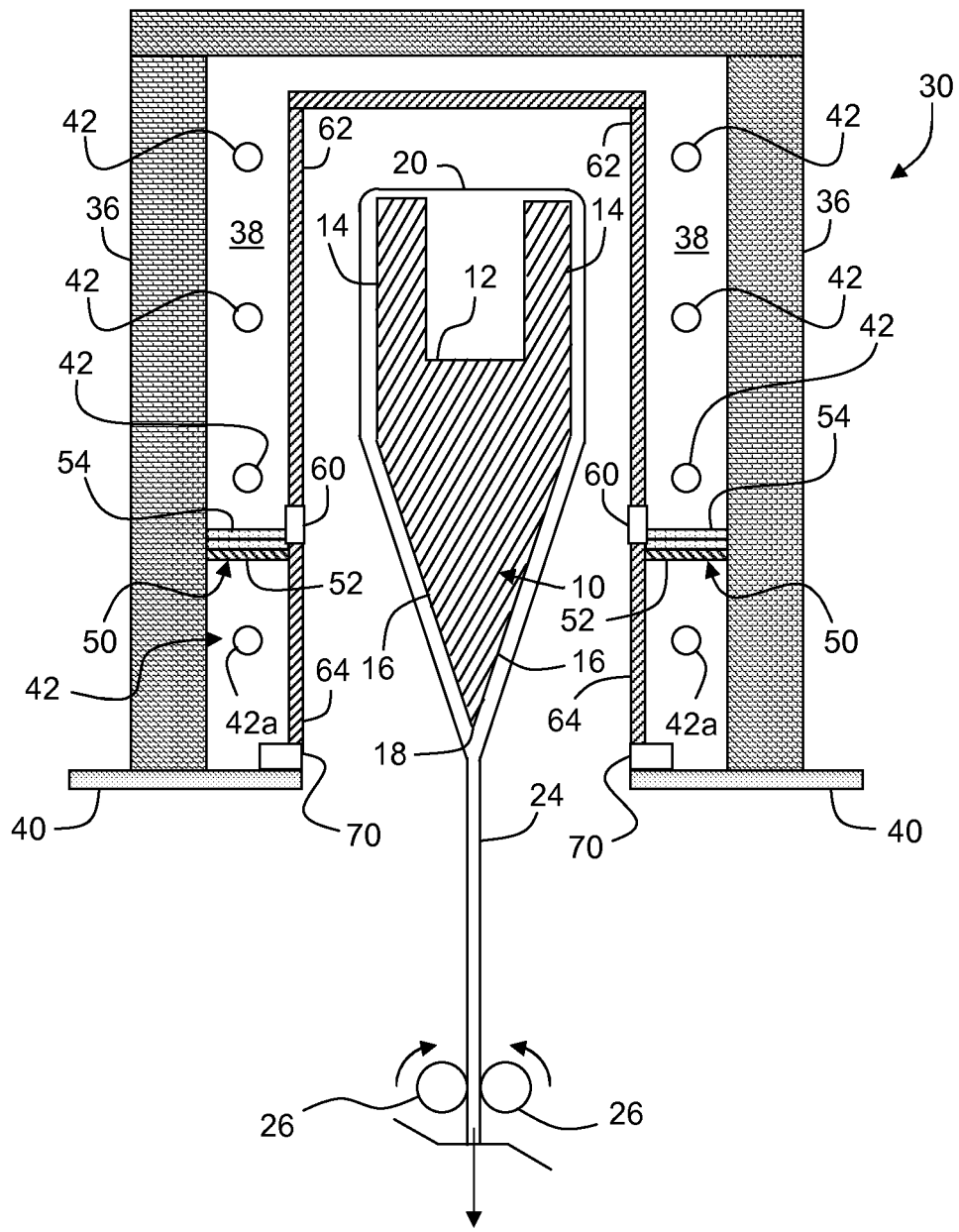
FIG. 2 is a cross sectional end view of an embodiment of the present disclosure where an insulating bock is positioned between an upper inner wall portion and a lower inner wall portion to decouple power changes in lower heating elements from temperature changes in the upper enclosure temperature, the insulating block being located above a thermal barrier extending across a plenum between the inner wall and an outer wall.

Accordingly, and as shown in FIG. 2, a thermal insulating block 60 is positioned between an upper inner wall portion 62 and a lower inner wall portion 64 to further decouple the temperature at the top of the enclosure from the temperature at the bottom of the enclosure. Thermal insulating block 60 separates upper inner wall portion 62 from lower inner wall portion 64 so that the upper and lower wall portions do not contact each another and thereby effectively inserts a thermal break within the inner wall that significantly reduces thermal conduction between the inner wall portions. The thermal insulating block 60 may be formed from a ceramic refractory material such as zircon for example (e.g. Zircon 1390). In the embodiment illustrated in FIG. 2, each insulating block is positioned above structural member 52. In addition, in some embodiments an insulating footing 70 that supports lower inner wall portion 64 may be positioned between lower inner wall portion 64 and support member 40, thereby thermally insulating the lower inner wall portion from the support member.

To better understand the impact of various thermal insulating options, mathematical modeling was undertaken. The effectiveness of these options was evaluated for six conditions outlined in the Table below. The model looked at the ratio of the temperature change at the root of the forming body to temperature change at a predetermined location at an upper region of the upper inner wall portion facing the forming body (MSU) following a step change in heat output from the lower-most heating element 42 (heating element 42*a*).

TABLE

| Option | ΔRoot/ΔMSU |
| --- | --- |
| No thermal barrier 50 | 1.10 |
| Member 52 without layer(s) 44 | 1.47 |
| Member 52 with 2.54 cm layer 54 | 2.04 |
| Member 52 with 5.08 cm layer 54 | 2.15 |
| Member 52 with 7.62 cm layer 54 | 2.4 |
| Member 52 with 5.08 cm layer 54 and insulator blocks 60 | 2.81 |

Data from the preceding Table show that combining a thermal insulating block 60 separating the inner upper wall portion from the inner lower wall portion with a thermal barrier 50 positioned between the lower-most heating element and a vertically adjacent heating element can provide for an effective decoupling of the upper enclosure temperature from a temperature change produced by the lower heating element.

Figure 3:
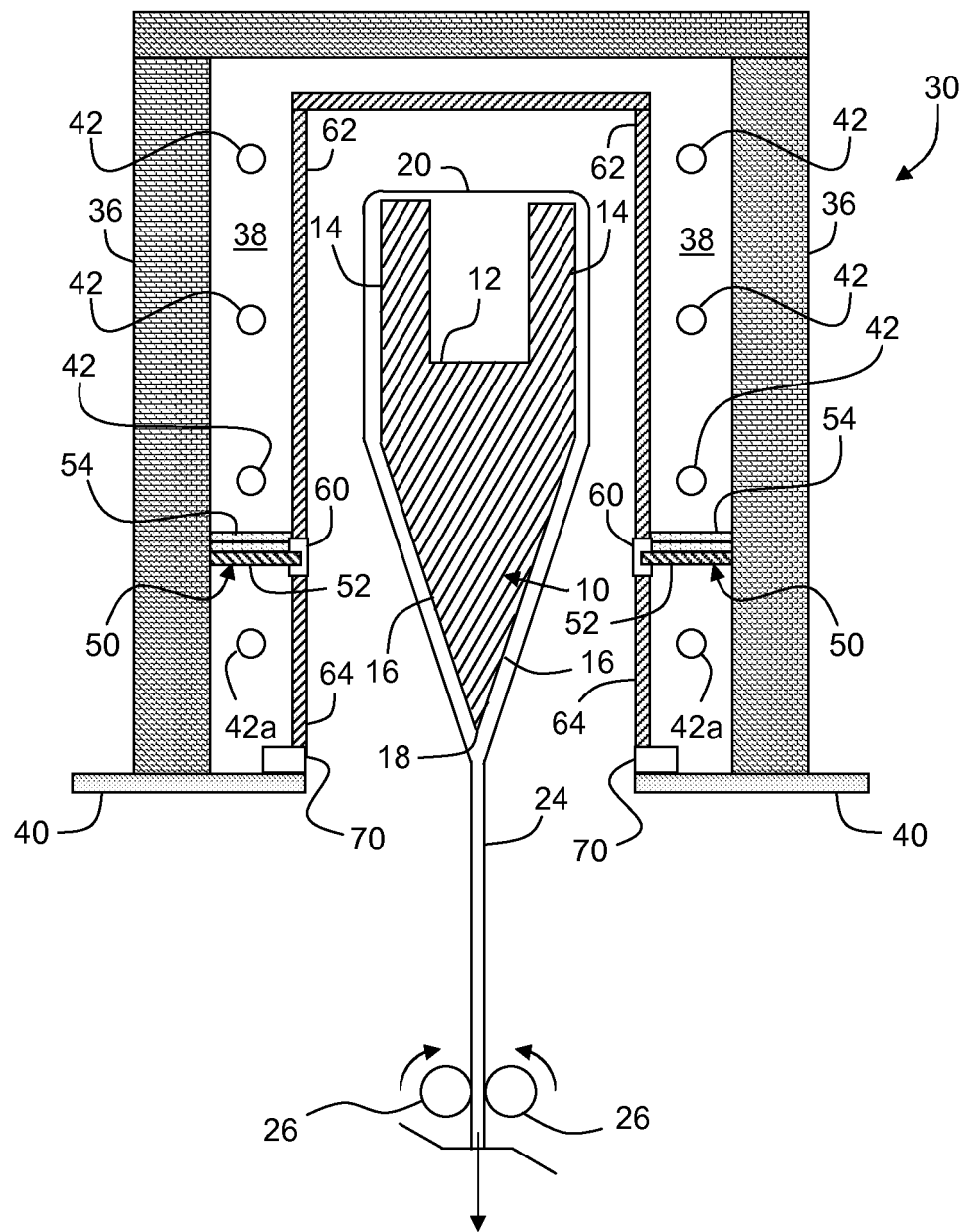
FIG. 3 is a cross sectional end view of another embodiment of the present disclosure where an insulating bock is positioned between an upper inner wall portion and a lower inner wall portion to decouple power changes in lower heating elements from temperature changes in the upper enclosure temperature, a thermal barrier extending across a plenum between the inner wall and an outer wall being supported by the insulating block.

In another embodiment shown in FIG. 3, thermal insulating block 60 is positioned so that the respective structural member 52 is supported by the insulating block. For example, one side of structural member 52 can be embedded within thermal insulating block 60 so that the structural member is thermally isolated from both upper inner wall portion 62 and lower inner wall portion 64.

Figure 4:
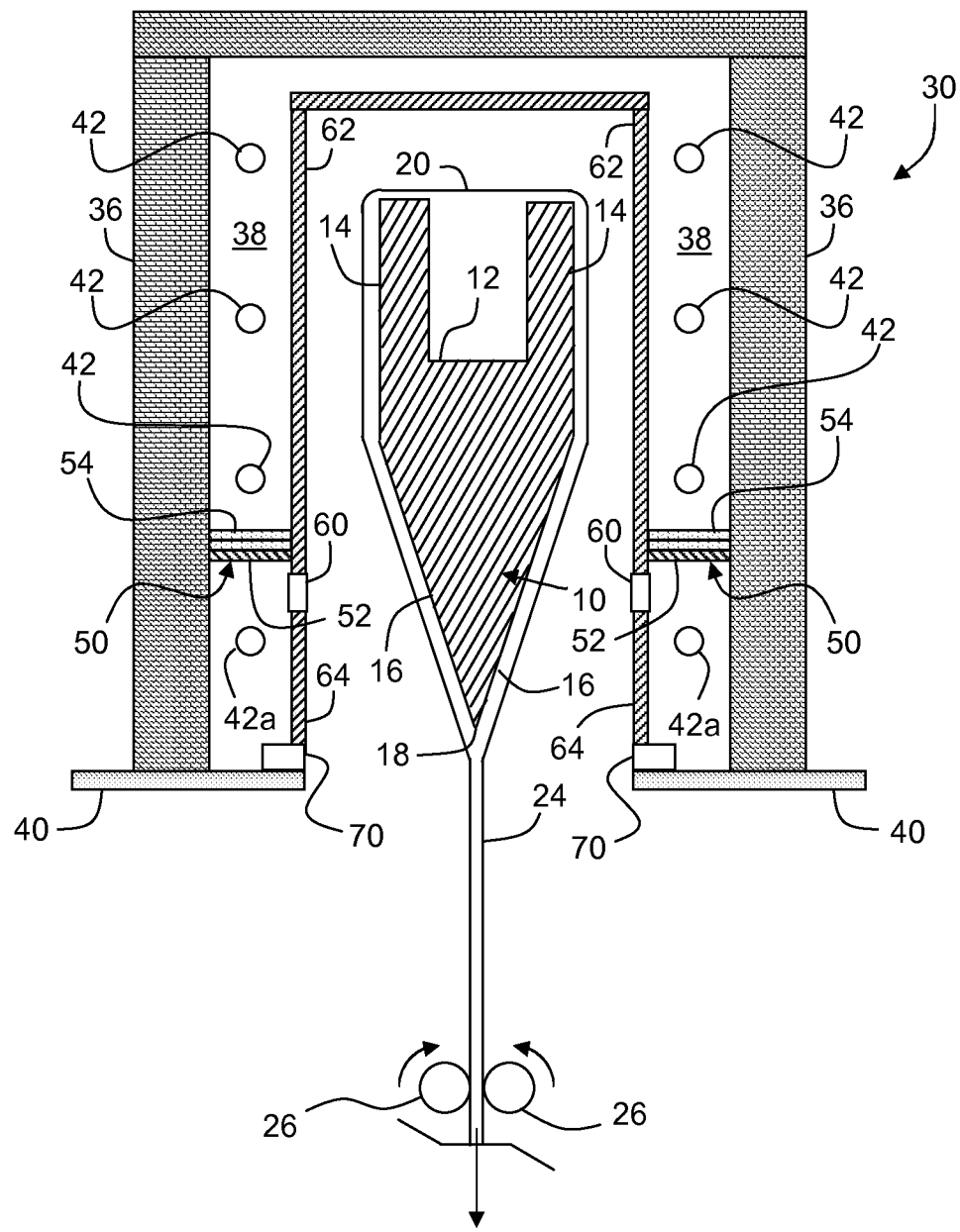
FIG. 4 is a cross sectional end view of still another embodiment of the present disclosure where an insulating bock is positioned between an upper inner wall portion and a lower inner wall portion to decouple power changes in lower heating elements from temperature changes in the upper enclosure temperature, the insulating block being located below a thermal barrier extending across a plenum between the inner wall and an outer wall.

In still another embodiment depicted in FIG. 4, thermal insulating block 60 is positioned below the respective structural member 52. Thus, for example, upper inner wall portion 62 is separated from and not in contact with lower inner wall portion 64. However, the structural member 52 may be in contact with upper inner wall portion 62 and, since structural member 52 may be a good thermal conductor, there can be more heat transfer from structural member 52 to upper inner wall portion 62 than is present in the embodiments of FIGS. 2 and 3. Accordingly, the embodiment of FIG. 4 is less effective when compared with the embodiments of FIGS. 2 and 3.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for forming a glass sheet comprising:
an enclosure comprising an upper inner wall portion, a lower inner wall portion and an outer wall spaced apart from the upper and lower inner wall portions to form a plenum therebetween;
a forming body comprising a trough and converging forming surfaces positioned within the enclosure;
a plurality of heating elements positioned within the plenum;
a thermal barrier extending across the plenum and positioned between a lower-most heating element and a vertically adjacent heating element, the thermal barrier comprising an insulating layer and a structural member; and
a thermal insulating block positioned between and separating the upper inner wall portion from the lower inner wall portion, wherein one side of the structural member is embedded within the thermal insulating block such that the structural member is thermally isolated from both the upper inner wall portion and the lower inner wall portion.

2. The apparatus according to claim 1, wherein the structural member is supported by the thermal insulating block.

3. The apparatus according to claim 1, wherein the lower inner wall portion is supported by a refractory insulating member.

4. The apparatus according to claim 1, wherein a thickness of the thermal barrier insulating layer is equal to or greater than about 2 cm.

5. An apparatus for forming a glass sheet comprising:
an enclosure comprising an upper inner wall portion, a lower inner wall portion and an outer wall spaced apart from the upper and lower inner wall portions to form a plenum therebetween;
a forming body comprising a trough and converging forming surfaces positioned within the enclosure;
a plurality of heating elements positioned within the plenum;
a thermal barrier extending across the plenum and positioned between a lower-most heating element of the plurality of heating elements and a vertically adjacent heating element, the thermal barrier comprising an insulating layer and a structural member;
a thermal insulating block positioned between and separating the upper inner wall portion from the lower inner wall portion; and
a refractory thermal insulating member positioned below and supporting the inner lower wall portion;
wherein one side of the structural member is embedded within the thermal insulating block such that the structural member is thermally isolated from both the upper inner wall portion and the lower inner wall portion.

6. The apparatus according to claim 5, wherein the thermal insulating block is in direct contact with the lower inner wall portion.

7. The apparatus according to claim 5, wherein the refractory thermal insulating member is in direct contact with the lower inner wall portion.

* * * * *